US010049109B2

(12) United States Patent
Wald et al.

(10) Patent No.: US 10,049,109 B2
(45) Date of Patent: *Aug. 14, 2018

(54) TECHNIQUES FOR CROWD SOURCING HUMAN TRANSLATIONS TO PROVIDE TRANSLATED VERSIONS OF WEB PAGES WITH ADDITIONAL CONTENT

(71) Applicant: Google LLC, Mountain View, CA (US)

(72) Inventors: Jonathan Wald, New York, NY (US); Aaron Baeten Brown, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/669,170

(22) Filed: Aug. 4, 2017

(65) Prior Publication Data

US 2017/0337188 A1    Nov. 23, 2017

Related U.S. Application Data

(63) Continuation of application No. 15/239,031, filed on Aug. 17, 2016, now Pat. No. 9,727,558, which is a
(Continued)

(51) Int. Cl.
*G06F 17/20* (2006.01)
*G06F 17/28* (2006.01)
(Continued)

(52) U.S. Cl.
CPC .............. *G06F 17/289* (2013.01); *G06F 8/71* (2013.01); *G06F 17/3089* (2013.01); *G06Q 30/0207* (2013.01); *G06Q 30/0277* (2013.01)

(58) Field of Classification Search
CPC ...... G06F 17/289; G06F 17/3089; G06F 8/71; G06Q 30/0207; G06Q 30/0277
(Continued)

(56) References Cited

U.S. PATENT DOCUMENTS 6,857,022 B1    2/2005    Scanlan
6,999,916 B2    2/2006    Lin et al.
(Continued)

FOREIGN PATENT DOCUMENTS

WO    2001057722 A1    8/2001

OTHER PUBLICATIONS

PCT International Search Report and Written Opinion dated Nov. 3, 2016 from PCT International Application No. PCT/US2016/046662, 9 pages.
(Continued)

*Primary Examiner* — Charlotte M Baker
(74) *Attorney, Agent, or Firm* — Fish & Richardson P.C.

(57) ABSTRACT

Techniques include outputting to a developer an offer to opt-in to a translation feature that enables human translators to translate their web page to a target language. In response to receiving a first request to opt-in to the translation feature, the server: generates and stores a web page copy, obtains from the human translators translations of at least a portion of the web page from its source language to the target language, modifies the web page copy based on the obtained translations to obtain a translated web page that is a translated version of the web page, detects a second request for the web page from a computing device associated with the target language, and in response to detecting the second request outputs, to the computing device, the translated web page with additional content relevant to the computing device or a user associated with the computing device.

20 Claims, 2 Drawing Sheets

Related U.S. Application Data continuation of application No. 14/836,224, filed on Aug. 26, 2015, now Pat. No. 9,430,466.

(51) Int. Cl.
*G06F 17/30* (2006.01)
*G06F 8/71* (2018.01)
*G06Q 30/02* (2012.01)

(58) Field of Classification Search
USPC ...................................... 704/8, 271; 707/756
See application file for complete search history.

(56) References Cited

U.S. PATENT DOCUMENTS

| | | | |
|---|---|---|---|
| 7,792,676 B2* | 9/2010 | Klinefelter | G06Q 10/10 704/271 |
| 8,250,083 B2* | 8/2012 | Bennett | G06F 17/289 707/756 |
| 9,235,569 B1* | 1/2016 | Wu | G06F 9/4448 |
| 9,710,821 B2* | 7/2017 | Heath | G06Q 30/0222 |
| 2005/0137873 A1 | 6/2005 | Liu | |
| 2009/0094517 A1 | 4/2009 | Brody et al. | |
| 2009/0287553 A1 | 11/2009 | Colucci | |
| 2011/0313755 A1 | 12/2011 | Oh | |

OTHER PUBLICATIONS

International Preliminary Report on Patentability issued in International Application No. PCT/US2016/046662, dated Mar. 8, 2018, 7 pages.

\* cited by examiner

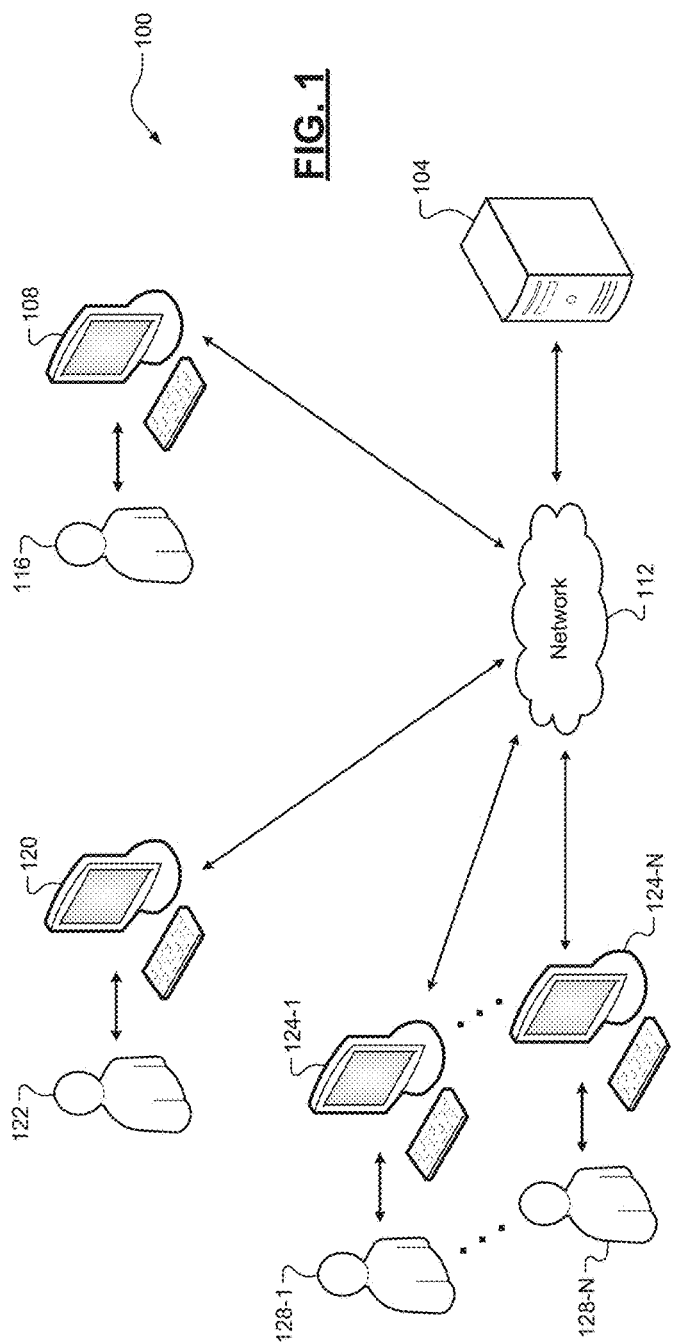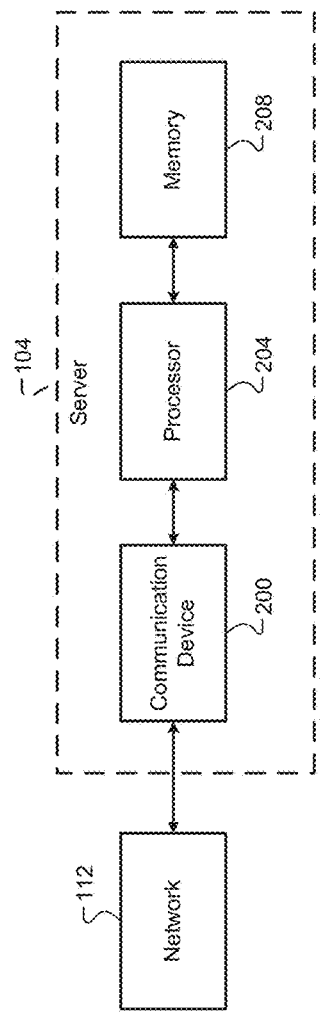

TECHNIQUES FOR CROWD SOURCING HUMAN TRANSLATIONS TO PROVIDE TRANSLATED VERSIONS OF WEB PAGES WITH ADDITIONAL CONTENT

CROSS-REFERENCE TO RELATED APPLICATIONS

This application is a continuation of U.S. patent application Ser. No. 15/239,031, filed Aug. 17, 2016, which is a continuation of U.S. patent application Ser. No. 14/836,224, filed Aug. 26, 2015, now U.S. Pat. No. 9,430,466. The entire disclosure of each of the above applications is incorporated herein by reference.

FIELD

The present application is generally directed to language translation and, more particularly, to techniques for crowd sourcing human translations to provide translated versions of web pages with additional content.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A majority of web pages are written in English. In order for non-English speaking users to consume the content of these web pages, the web pages must first be translated from English to a different target language. The translations can be performed by human translator (manual translation) and/or by a computer system (machine translation). While machine translation is typically faster and less expensive, manual translation can typically provide higher quality translations. Unfortunately, professional human translators can be very expensive. Thus, obtaining high quality translations of such web pages from English to other target languages represents a complex task. Further, a developer or publisher of the web page may have little or no incentive to translate their web page to less utilized target languages.

SUMMARY

A computer-implemented technique is presented. The technique can include outputting, from the server to a developer of a web page in a source language, an offer to opt-in to a translation feature that enables one or more other users to translate the web page to a different target language; receiving, by the server from the developer, a first request to opt-in to the translation feature; and in response to receiving the first request to opt-in to the translation feature: generating and storing, by the server, a copy of web page; obtaining, by the server from the one or more other users, translations of at least a portion of the web page from the source language to the target language; modifying, by the server, the web page copy based on the obtained translations to obtain a translated web page, the translated web page being a translated version of the web page; detecting, by the server, a second request for the web page from a computing device associated with the target language; and in response to detecting the second request, outputting, from the server to the computing device, the translated web page with additional content relevant to the computing device or a user associated with the computing device.

Also presented are a server having one or more processors configured to perform operations and a computer-readable medium having instructions stored thereon which, when executed by one or more processors of a server, cause the server to perform the operations. The operations can include outputting, to a developer of a web page in a source language, an offer to opt-in to a translation feature that enables one or more other users to translate the web page to a different target language; receiving, from the developer, a first request to opt-in to the translation feature; and in response to receiving the first request to opt-in to the translation feature: generating and storing a copy of web page; obtaining, from the one or more other users, translations of at least a portion of the web page from the source language to the target language; modifying the web page copy based on the obtained translations to obtain a translated web page, the translated web page being a translated version of the web page; detecting a second request for the web page from a computing device associated with the target language; and in response to detecting the second request, outputting, to the computing device, the translated web page with additional content relevant to the computing device or a user associated with the computing device.

In some embodiments, the technique or operations can further include identifying, by the server, the web page as being at least one of a high-traffic web page having greater than a particular rate of user visits and a highly-requested web page for machine translation having greater than a particular rate of user machine translation requests, wherein outputting the offer is performed in response to identifying the web page as being at least one of the high-traffic and the highly-requested web page. In some embodiments, the technique or operations can further include intercepting, by the server from the computing device, the second request for the web page, wherein outputting the translated web page with the advertisement is performed in response to intercepting the second request.

In some embodiments, the technique or operations can further include based on user interaction with the additional content, coordinating, by the server, monetary compensation for the developer of the web page. In some embodiments, the additional content can comprise an advertisement, and the technique or operations can further include detecting, by the server, a selection of the advertisement by the user associated with the computing device, wherein coordinating the monetary compensation is performed in response to detecting the advertisement selection.

In some embodiments, the second request for the web page is a search query that has corresponding search results that include the web page. In some embodiments, the technique or operations can further include in response to receiving the first request to opt-in to the translation feature, modifying, by the server, a document object model (DOM) of the web page copy to include JavaScript for providing the additional content.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a diagram of an example computer system according to some implementations of the present disclosure;

FIG. 2 is a functional block diagram of an example server of FIG. 1; and

DETAILED DESCRIPTION

Figure 3:
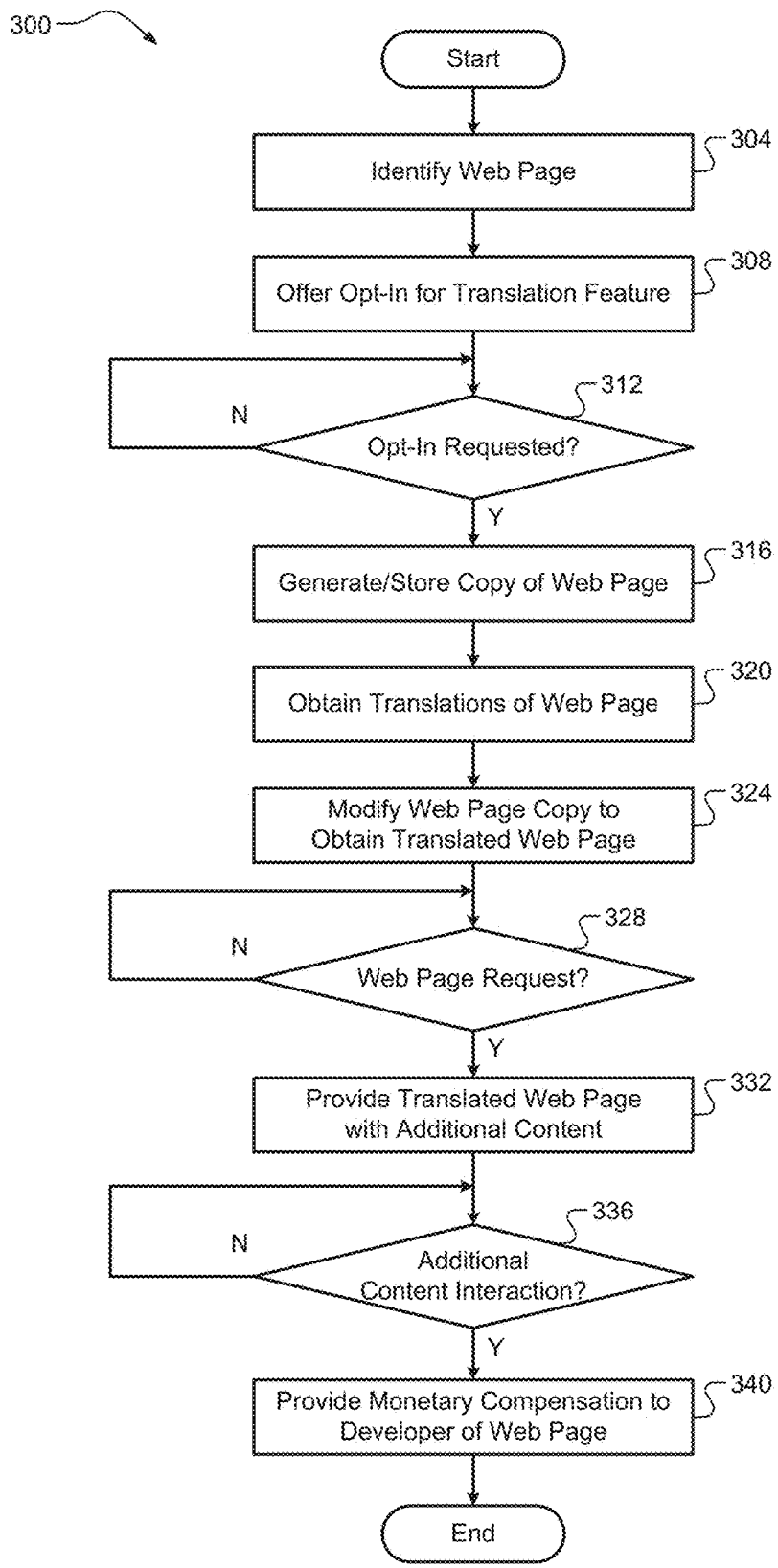
FIG. 3 is a flow diagram of an example technique for crowd sourcing human translations to provide translated versions of web pages with additional content according to some implementations of the present disclosure.

While professional human translators can be very expensive, other native or proficient speakers of a particular target language can also provide high quality translations. Enabling these users to provide manual translations of a web page, however, can be difficult for a developer or publisher of the web page. Conventional techniques may require the developer or publisher (hereinafter "developer") to add complex code (e.g., JavaScript) to the web page that outsources the human translation activities to a translation provider. The term "developer" as used herein can also encompass an owner or other user that has control over the web page. The developer may also be responsible for contracting with the translation provider, including determining a compensation structure. Thus, the developer may have little or no incentive to enable the translation of their web page to different target languages and, more particularly, to less utilized target languages.

Accordingly, techniques are presented for crowd sourcing human translations to provide translated versions of web pages with additional content. These techniques can be both passive (e.g., automatically offered) and simple, by reducing activities such as onboarding, technical integration, translation vendor selection, and additional content decisions to one click, thereby making the experience for the developer easier while also providing them with a potential revenue stream via the additional content. This additional content, for example, may improve a user experience at the translated version of the web page. In some implementations, this revenue stream may be generated via advertisements placed on the various translated versions of their web page and the developers can be compensated based on a number of clicks of these advertisements. These techniques also represent a solution that is rooted in computer technology to overcome a problem specifically arising in the realm of computer networks: enabling web page developers to obtain high quality human translations of their web pages with little to no implementation effort.

Referring now to FIG. 1, a diagram of an example computer system 100 is illustrated. The computer system 100 can include an example server 104 according to some implementations of the present disclosure. The term "server" as used herein can refer to a single computer or a plurality of computers operating in a parallel or distributed architecture. The server 104 can communicate with a developer computing device 108 via a network 112. The network 112 can be a local area network (LAN), a wide area network (WAN), e.g., the Internet, or a combination thereof. The developer computing device 108 can be associated with a developer 116 of a particular web page. The server 104 can also communicate with a requesting computing device 120 that requests the web page and a plurality of translator computing devices 124-1 . . . 124-N (N>1; collectively "translator computing devices 124"). The translator computing devices 120 can be associated with a plurality of human translators 128-1 . . . 128-N (collectively "human translators 128"). Any communication herein between the server 104 and the developer 116, a requesting user 122, and the human translators 128 can be between the server 104 and the developer computing device 108, the requesting computing device 120, and the translator computing devices 124.

Referring now to FIG. 2, a functional block diagram of the example server 104 is illustrated. The server 104 can include a communication device 200, a processor 204, and a memory 208. The communication device 200 can be any suitable device, such as a transceiver, that is configured for communication via the network 112. The memory 208 can be any suitable storage medium (flash, hard disk, etc.) that is configured to store information at the server 104. The processor 204 can be configured to control operation of the server 104, including executing/loading an operating system of the server 104, controlling communication via the communication device 200 and controlling read/write operations at the memory 208. The processor 204 can also be configured to perform at least a portion of the techniques of the present disclosure, which are discussed in greater detail below. The term "processor" as used herein can refer to both a single processor and a plurality of processors operating in a parallel or distributed architecture.

The server 104 can identify the web page associated with the developer 116. In some implementations, the server 104 can identify the web page as being at least one of a high-traffic web page and a highly-requested web page for machine translation. For example, the identification of the web page as being high-traffic and/or highly-requested for machine translation may be based on statistics associated with the domain that hosts the web page. By identifying high-traffic and/or highly-requested web pages for machine translation, an offer for the developer 116 to opt-in to the translation feature of the present disclosure may be more enticing. More particularly, because more users visit the high-traffic or highly-requested web page for machine translation, the developer 116 may be more likely to receive greater monetary compensation than other web pages that opt-in to the translation feature. The term "high-traffic" as used herein can refer to a particular web page receiving greater than a certain number of visits during a certain period of time (e.g., a particular rate of user visits). Similarly, the term "highly-requested" as used herein can refer to a particular web page receiving greater than a certain number of machine translation requests during a certain period of time (e.g., a particular rate of user machine translation requests). The web page can also be identified using other suitable techniques, such as based on previous activity of the developer.

After identifying the web page, the server 104 can determine whether the developer 116 would like to opt-in to the translation feature. The opt-in process may include the server 104 transmitting an offer to the developer 116 to opt-in to the translation feature. This offer could be a web-based offer (e.g., during web browsing) or could be communicated via other electronic mediums, such as an email to the registered owner of the web page or a text message. In some implementations, the offer may include an estimated amount of revenue that could be expected by the developer 116 by opting in. The developer 116 can then provide a response to the offer. For example, the response may be a request (also referred to as a "first request") to opt-in to the translation feature. By receiving the request to opt-in to the translation feature, the server 104 can perform a sequence of operations to implement the translation feature. This opt-in request can also authorize the server 104 to generate and store one or more copies of the web page as part of the translation feature.

First, the server 104 can generate and store a copy of web page. The web page copy can be distinct copy of the web page that is separately stored and manipulated by the server as part of the translation feature. In some implementations, the server 104 can modify a document object model (DOM) of the web page copy to include code (e.g., JavaScript) for providing additional content. The additional content can be content that is relevant to the requesting user 122. For example only, the additional content may be an advertisement, which can be utilized to generate the revenue for the developer 116 as discussed in greater detail below. Other additional content could also be provided, such as links, images, articles, and the like, which could be based on a profile or a search history of the requesting user 122. After generating and storing the web page copy, the server 104 can obtain translations from the human translators 128 of at least portions of the web page. These translations can be provided by the human translators 128 using any suitable translation capturing/input techniques. For example, the human translators 128 may provide the translations via their web browsers while viewing the web page.

The server 104 can modify the web page copy based on the received translations. This modification can include replacing portions of the web page copy with the translations. In some implementations, this modification may only occur after some sort of verification of the accuracy of each particular translation. The modified web page copy can also be referred to as a translated web page. As previously discussed, the translated web page (in the target language) is separately stored from the web page (in the source language). In response to a request for the web page from a computing device associated with the target language (e.g., the requesting computing device 120), the server 104 can provide the translated web page with the additional content. This association with the target language can be determined, for example, based on language preference settings of a user of the computing device (e.g., the requesting user 122 of the requesting computing device 120). In some implementations, the server 104 can intercept this request for the web page (also referred to as a "second request").

This interception can be performed such that the second request never reaches a source server associated with the web page. Instead, by intercepting the second request, the source server never knows that the web page was requested, and the server 104 provides the translated web page with the additional content. In some implementations, the providing of the translated web page can include information or a disclaimer that the translated web page is a translated version of the web page. If the visiting user 122 does not want to view the translated web page after being informed, their second request could then be directed to the source server for the web page, thereby redirecting them to the web page in the source language. In some implementations, this interception can be performed because the server 104 can be associated with (i) a web-based search engine where a search query was provided and/or (ii) a web browser having an address bar where the search query was provided. The search query can have corresponding search results that include the web page.

After providing the translated web page with the additional content, user interaction may occur with the additional content. For example, this user interaction may be a click-through of an advertisement where the requesting user 122 selects the advertisement and is redirected to another web page associated with an advertiser. In exchange for this interaction, the advertiser can provide monetary compensation. This monetary compensation typically is provided to an advertisement service, such as one associated with the server 104. As part of the translation feature, however, at least a portion of this monetary compensation associated with the advertisement can be provided to the developer 116. Alternatively, the monetary compensation for the developer 116 could be directly paid by the advertisement service. For example, as part of the opt-in process, a payment account can be created for the developer 116 in which monetary compensation is deposited based on the on-going interaction with the additional content (e.g., an advertisement) on the translated web page.

Referring now to FIG. 3, a flow diagram of an example technique 300 for crowd sourcing human translations using automated revenue sharing is illustrated. At 304, the server 104 can identify the web page in the source language (e.g., English). For example, the server 104 may identify the web page as being a high-traffic web page and/or a highly-requested web page for machine translation. At 308, the server 104 can output, to the developer 116 of the web page, an offer to opt-in to the translation feature. As discussed herein, the translation feature can (i) enable the human translators 128 to translate the web page to a different target language and (ii) provide monetary compensation to the developer 116. At 312, the server 104 can determine whether the first request to opt-in to the translation feature has been received from the developer 116. If true, the technique 300 can proceed to 316. Otherwise, the technique 300 can end or return to 312.

At 316, the server 104 can generate and store the web page copy. At 320, the server 104 can obtain, from the human translators 128, translations of at least a portion of the web page from the source language to the target language. At 324, the server 104 can modify the web page copy based on the obtained translations to obtain the translated web page. At 328, the server 104 can determine whether a second request for the web page has been generated by a requesting computing device. If true, the technique 300 can proceed to 332. Otherwise, the technique 300 can end or return to 328. At 332, the server 104 can output, to the requesting computing device, the translated web page with additional content. At 336, the server 104 can optionally detect additional content interaction and, based on user interaction, provide the developer 116 with monetary compensation at 340. The technique 300 can then end or return to 304.

In addition to obtaining human translations of web pages, in some implementations the techniques herein can further provide for allowing the human translators to create/add additional content that was not previously part of a particular web page as created by the developer. This new content, for example, may relate to or be specific to the target language. Examples of this new content include links, text, pictures, and audio/video. In one implementation, this new content could be an entirely new web page. This new content could be implemented in the existing template/structure of the web page (i.e., as intended by the developer). The new content could be stored in the cloud (e.g., at a remote server) but could still function seamlessly as a part of the web page as originally intended by the developer.

The techniques described herein are also not limited to web pages. In still other implementations, these techniques can be extended to web-based and native (e.g., mobile) software applications. In such applications, text strings are presented as part of the user interface (UI). In one implementation, a software development kit (SDK) could be provided that enables the application developers to enable human translators to translate their application's UI strings. In other words, this code would function in the same or similar manner as the JavaScript discussed herein with respect to the web page. Once added to their application, cloud-stored translations could be retrieved and incorporated into the running application. The language for the translations could be, for example, based on the user's location, and the user could also be able to toggle between languages.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   determining, by one or more computers, that a web page in a source language has been opted in to a translation feature that enables one or more other users to translate the web page to a different target language;
   obtaining, by the one or more computers and from the one or more other users, translations of at least a portion of the web page from the source language to the target language;
   generating, by the one or more computers, a translated web page based on the obtained translations, wherein the translated web page is a translation of the web page into the target language;
   detecting, by the one or more computers, a request for the web page from a computing device associated with the target language; and
   outputting, from the one or more computers and to the computing device, the translated web page.

2. The computer-implemented method of claim 1, further comprising:
   determining, by the one or more computers, that the web page is at least one of (i) a high-traffic web page having greater than a particular rate of user visits, or (ii) a highly-requested web page for machine translation having greater than a particular rate of user machine translation requests; and
   in response, outputting an offer to a developer of the web page to opt in to the translation feature.

3. The computer-implemented method of claim 1, wherein outputting the translated web page is performed in response to intercepting, by the one or more computers, the request for the web page from the computing device.

4. The computer-implemented method of claim 1, wherein the request for the web page is a search query that results in the selection of a search result identifying the web page.

5. The computer-implemented method of claim 1, wherein the translations of at least a portion of the web page are provided by the one or more users via web browsers while viewing the web page.

6. The computer-implemented method of claim 1, further comprising modifying, by the one or more computers and in response to determining that the web page has been opted in to the translation feature, a document object model (DOM) of the translated web page to include JavaScript for providing additional content to the translated web page.

7. The computer-implemented method of claim 6, wherein the additional content comprises links, images, or articles in the target language based on a profile or a search history of the computing device.

8. A system comprising one or more computers and one or more storage devices storing instructions that when executed by the one or more computers cause the one or more computers to perform operations comprising:
   determining that a web page in a source language has been opted in to a translation feature that enables one or more other users to translate the web page to a different target language;
   obtaining, from the one or more other users, translations of at least a portion of the web page from the source language to the target language;
   generating a translated web page based on the obtained translations, wherein the translated web page is a translation of the web page into the target language;
   detecting a request for the web page from a computing device associated with the target language; and
   outputting, to the computing device, the translated web page.

9. The system of claim 8, wherein the operations further comprise:
   determining that the web page is at least one of (i) a high-traffic web page having greater than a particular rate of user visits, or (ii) a highly-requested web page for machine translation having greater than a particular rate of user machine translation requests; and
   in response, outputting an offer to a developer of the web page to opt in to the translation feature.

10. The system of claim 8, wherein outputting the translated web page is performed in response to intercepting the request for the web page from the computing device.

11. The system of claim 8, wherein the request for the web page is a search query that results in the selection of a search result identifying the web page.

12. The system of claim 8, wherein the translations of at least a portion of the web page are provided by the one or more users via web browsers while viewing the web page.

13. The system of claim 8, wherein the operations further comprise modifying, in response to determining that the web page has been opted in to the translation feature, a document object model (DOM) of the web page to include JavaScript for providing additional content for the translated web page.

14. The system of claim 13, wherein the additional content comprises links, images, or articles in the target language based on a profile or a search history of the computing device.

15. One or more non-transitory computer-readable storage media storing instructions that when executed by one or more computers cause the one or more computers to perform operations comprising:
   determining that a web page in a source language has been opted in to a translation feature that enables one or more other users to translate the web page to a different target language;

obtaining, from the one or more other users, translations of at least a portion of the web page from the source language to the target language;

generating a translated web page based on the obtained translations, wherein the translated web page is a translation of the web page into the target language;

detecting a request for the web page from a computing device associated with the target language; and outputting, to the computing device, the translated web page.

16. The one or more non-transitory computer-readable storage media of claim 15, wherein the operations further comprise:

determining that the web page is at least one of (i) a high-traffic web page having greater than a particular rate of user visits, or (ii) a highly-requested web page for machine translation having greater than a particular rate of user machine translation requests; and in response, outputting an offer to a developer of the web page to opt in to the translation feature.

17. The one or more non-transitory computer-readable storage media of claim 15, wherein outputting the translated web page is performed in response to intercepting the request for the web page from the computing device.

18. The one or more non-transitory computer-readable storage media of claim 15, wherein the request for the web page is a search query that results in the selection of a search result identifying the web page.

19. The one or more non-transitory computer-readable storage media of claim 15, wherein the operations further comprise modifying, in response to determining that the web page has been opted in to the translation feature, a document object model (DOM) of the web page to include JavaScript for providing additional content for the translated web page.

20. The one or more non-transitory computer-readable storage media of claim 19, wherein the additional content comprises links, images, or articles in the target language based on a profile or a search history of the computing device.

* * * * *